United States Patent
Affaticati

(10) Patent No.: US 10,205,889 B2
(45) Date of Patent: Feb. 12, 2019

(54) METHOD OF REPLACING OBJECTS IN A VIDEO STREAM AND COMPUTER PROGRAM

(71) Applicants: Jean-Philippe Jacquemet, Divonne-les-Bains (FR); Jean-Luc Affaticati, Divonne-les-Bains (FR)

(72) Inventor: Jean-Luc Affaticati, Divonne-les-Bains (FR)

(73) Assignee: Digitarena SA, Martigny (CH)

( * ) Notice: Subject to any disclaimer, the term of this patent is extended or adjusted under 35 U.S.C. 154(b) by 198 days.

(21) Appl. No.: 14/773,614

(22) PCT Filed: Mar. 8, 2013

(86) PCT No.: PCT/IB2013/000318
§ 371 (c)(1),
(2) Date: Sep. 8, 2015

(87) PCT Pub. No.: WO2014/135910
PCT Pub. Date: Sep. 12, 2014

(65) Prior Publication Data
US 2016/0028968 A1 Jan. 28, 2016

(51) Int. Cl.
*H04N 5/272* (2006.01)
*G06T 15/40* (2011.01)
(Continued)

(52) U.S. Cl.
CPC .............. *H04N 5/272* (2013.01); *G06T 7/11* (2017.01); *G06T 7/174* (2017.01); *G06T 7/194* (2017.01);
(Continued)

(58) Field of Classification Search
CPC .................................................... H04N 5/272
See application file for complete search history.

(56) References Cited

U.S. PATENT DOCUMENTS 6,141,060 A 10/2000 Honey et al.
7,116,342 B2 10/2006 Dengler et al.
(Continued)

FOREIGN PATENT DOCUMENTS

GB 2416949 A 2/2006
WO WO 9700581 A1 1/1997
(Continued)

OTHER PUBLICATIONS

Jin Liu et al: "Layered Representation of Scenes Based on Multiview Image Analysis," IEEE Transactions on Circuits and Systems for Video Technology, vol. 10, No. 4, Jun. 1, 2000 (Jun. 1, 2000, XP011014062, ISSN: 1051-8215.
(Continued)

*Primary Examiner* — Jonathan R Messmore
(74) *Attorney, Agent, or Firm* — Finnegan, Henderson, Farabow, Garrett & Dunner, LLP

(57) ABSTRACT

The invention relates to a method for replacing objects in a video stream. A stereoscopic view of the field is created. It serves to measure the distance from the camera and to determine the foreground, background and occluding objects. The stereoscopic view can be provided by a 3D camera or it can be constructed using the signal coming from a single camera or more. The texture of the objects to be replaced can be static or dynamic. The method does not require any particular equipment to track the camera position and it can be used for live content as well as archived material. The invention takes advantage of the source material to be replaced in the particular case when the object to be replaced is filled electronically.

20 Claims, 7 Drawing Sheets

(51) Int. Cl.
*G06T 7/593* (2017.01)
*G06T 7/11* (2017.01)
*G06T 7/174* (2017.01)
*G06T 7/194* (2017.01)
*H04N 13/239* (2018.01)

(52) U.S. Cl.
CPC ............ *G06T 7/593* (2017.01); *G06T 15/405*
(2013.01); *H04N 5/2723* (2013.01); ***H04N
13/239*** (2018.05); *G06T 2200/04* (2013.01);
*G06T 2207/10021* (2013.01); *G06T
2207/10028* (2013.01); *G06T 2207/20221*
(2013.01); *G06T 2207/30244* (2013.01)

(56) References Cited

U.S. PATENT DOCUMENTS

| | | | |
|---|---|---|---|
| 7,230,653 | B1 | 6/2007 | Overton et al. |
| 7,689,062 | B2 | 3/2010 | Baharav et al. |
| 2009/0219283 | A1* | 9/2009 | Hendrickson ...... H04N 13/0022 345/420 |
| 2010/0067865 | A1 | 3/2010 | Saxena et al. |
| 2010/0315510 | A1 | 12/2010 | Dunn et al. |
| 2011/0222757 | A1 | 9/2011 | Yeatman, Jr. et al. |
| 2013/0063556 | A1* | 3/2013 | Russell ................ H04N 13/026 348/42 |
| 2013/0278727 | A1* | 10/2013 | Tamir ................. H04N 13/0048 348/47 |
| 2014/0192148 | A1* | 7/2014 | Georgakis .......... H04N 13/0011 348/42 |

FOREIGN PATENT DOCUMENTS

| | | | | |
|---|---|---|---|---|
| WO | WO 0135641 A1 * | 5/2001 | ............ | H04N 5/272 |
| WO | WO 2009018135 A1 | 2/2009 | | |
| WO | WO 2010067350 A1 | 6/2010 | | |

OTHER PUBLICATIONS

Gellen B et al: "Zuchauerplatze mitten im Geschehen," FKT Fernseh Und Kinotechnik, Fachverlag Schiele & Schon Gmbh, Berlin, DE, vol. 64, No. 8-9, Aug. 1, 2010 (Aug. 1, 2010), pp. 415-419, XP001558108, ISSN: 1430-9947.
International Preliminary Report on Patentability for International Application PCT/IB2013/000318, dated Jun. 3, 2015 (9 pages).
Written Opinion of the International Preliminary Examining Authority for International Application No. PCT/IB2013/000318, dated Aug. 1, 2014 (5 pages).
Written Opinion of the international Searching Authority for International Appiication No. PCT/IB2013/000318, dated Oct. 17, 2013 (7 pages).

* cited by examiner

Fig.7
Fig.8
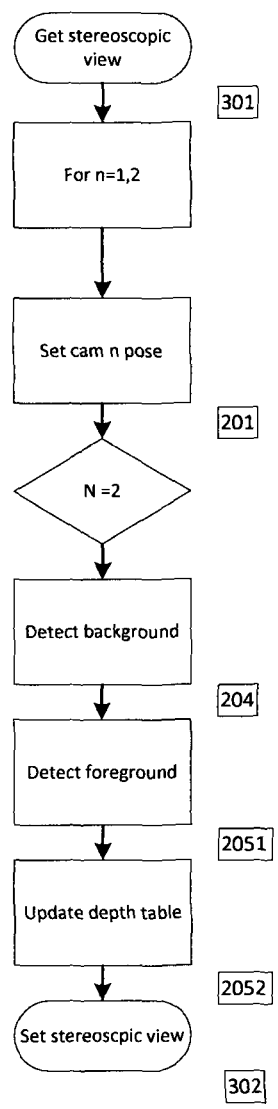
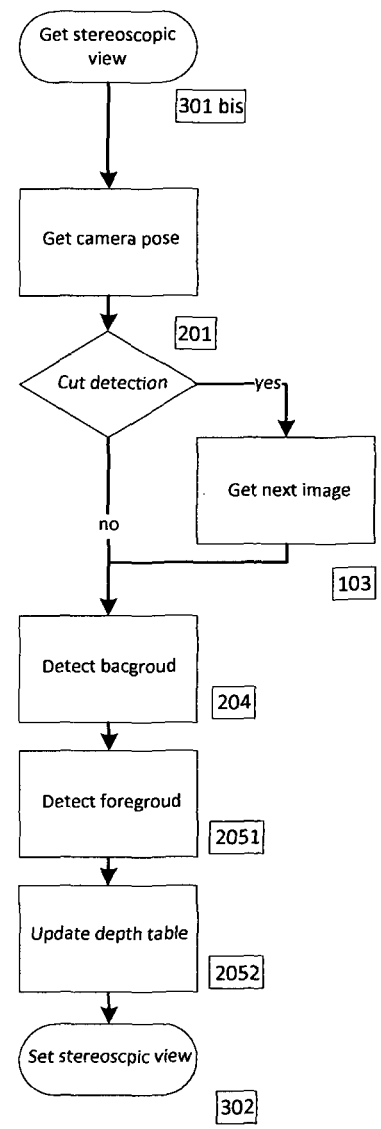

METHOD OF REPLACING OBJECTS IN A VIDEO STREAM AND COMPUTER PROGRAM

CROSS-REFERENCE TO RELATED PATENT APPLICATIONS

This application is a National Stage Entry under 35 U.S.C. § 371 of International Application No. PCT/IB2013/000318, filed on Mar. 8, 2013. The entire contents of the above-referenced application are expressly incorporated herein by reference for all purposes.

The present invention relates to image processing and more specifically to a method of replacing objects in a video stream as well as to a computer program for executing the method.

More particularly the method is directed to detect and identify objects to be replaced in a video stream and to replace them with a replacement image or sequence of images. A typical application of the present method may be used during the live broadcast of sporting events to replace advertisement images appearing on perimeter boards surrounding the play field or other areas at the venue. This allows the delivery of multiple advertisement content appearing on these areas when broadcasting to different locations.

Virtual insertion, augmented reality and image replacement has been a research field for the past 15 years. Many different methods have been proposed to make virtual images look as realistic and natural as possible taking into account the moving objects occluding the foreground images to be replaced.

The existing technologies can be categorized in four main pools:
  tracking the camera equipment;
  landmark recognition;
  manual selection of the object or area to be replaced;
  prior recognition of the image to be substituted by image analysis means.

Such technologies suffer from limitations making them either impracticable or unreliable especially in live broadcasting. Image replacement is supposed to increase the sponsorship or advertisement revenue, so the methods need to guarantee operability in various cases, so the revenue stream can be secured. The existing solutions, however, have major limitations.

Tracking cameras with pedestals using measurement equipment can only happen at the venue and requires specific equipment and operators. Many broadcast operations cannot afford such a tracking overhead.

Free camera view requested for covering the game does not ensure that any landmark will be visible on the captured image. Landmark recognition can only be applied for some cameras and some shots.

Manual interaction, especially marking the replacement area on a video image, takes too long to be used for live events. It forces a multi-second delay that is not practicable.

Image recognition techniques have been used to recognise the object pattern in the captured image. Evolution of dynamic advertisement (deploying full motion video on billboards, perimeters, screens . . . ) makes these methods obsolete, since the image to be replaced typically cannot be predicted.

Most of the existing work is based on camera positioning systems (tracking heads, GPS, lens-based measurement) and/or visible landmarks (often the playfield lines and figures).

For example, this is the case for:
  WO 97/00581A1: requires at least three landmarks to be visible
  WO 2009/018135A1: GPS based object location with 3D object model adaptation.
  U.S. Pat. No. 7,230,653B1: method based on tracking and sensor telemetry with GPS and lens direction pointing measurement; furthermore, this patent identifies the image from a static reference CAD model making it impracticable for LED boards' replacement Some methods include a manual object identification process, making them impracticable for live events and multiple object replacement (such as surrounding perimeter boards):
  U.S. Pat. No. 7,689,062B2: implant containers in the source video segments; this is a pure post processing process that cannot be used in live event broadcasting.
  US2010067865A1: user selected input region required, making it inappropriate for live events when automatic region detection must be performed in real time.

Past methods, when the content of the perimeter boards was static, do not match the dynamic content requirements of current LED boards. All these methods require advance identification of the static images to be substituted:
  U.S. Pat. No. 7,116,342B2 describes a method that is based on a colour separation model to identify, store and index regions of interest, and thus cannot be used with dynamic content of perimeter boards.

Perimeter boards being in the main field of view of cameras during the game, methods finding areas of least relevance for the viewers and outside the playfield are simply not relevant; this is the case for the method disclosed in GB2416949A which focuses on outside the playing areas and sequences outside the game itself.

Some other methods are not applicable for the video image background objects, since they focus on the foreground. WO2010067350A1, for example, identifies foreground objects in the video stream to add virtual inserts.

The cameras used in today's TV production for news and sports are becoming faster and lighter. Production is increasingly mobile, freed from heavy pedestals. Camera positions and camera parameters can change more frequently during a recording, and it is no longer acceptable to cope with the cost and operating constraints of fixed cameras with tracking equipment.

An increasing number of advertisement screens have populated our daily environment. These screens, initially limited to static content, progressively moved to rolling banners and then dynamically fed electronic content. It is impossible to replace the electronic dynamic content using the methods disclosed in the prior art. At the same time, the placement of electronic screens is taking advantage of the most pre-eminent advertisement spaces inside the TV feed.

Image replacement needs to be available for live, replay or even historic content. This means that if any specific hardware is required at the venue, archive recorded without this piece of equipment can simply not be used for image replacement. The use of pure computer vision techniques (requiring no specific on-site hardware) makes the image replacement applicable to live operations and/or post production and archive content.

It is an object of the present invention to solve the above mentioned drawbacks and to provide a method for inserting replacement images into a video stream without requiring the acquisition and the transmission of camera to parameters through costly sensor equipment mounted on the pedestal of cameras, and without the need of a static model of the live environment.

Another object of the invention is to provide a method that can be used for live broadcasting as well as for post-production when having access only to the recorded images. The proposed method is adapted to the replacement of dynamic images appearing on background objects such as perimeter boards or billboards having a dynamic content.

A further object of the invention is to provide a computer program for implementing the method. The computer program may be supplied on a recording medium or on a communication medium. Each of the recording medium and the communication medium can provide the computer program in a computer readable fashion to a general-purpose computer system executing a variety of program codes. With the computer program supplied in a computer readable fashion, the computer system executes processes responsive to the computer program.

For that purpose, it is a goal of the present invention to provide a method for creating a representation of the video image identical to what the human eyes would see, by creating a stereoscopic 3D view, like the human brain does. Using the stereoscopic 3D interpretation of the image, the proposed method may determine the actual position in the image of the objects to be replaced and the possible foreground objects occluding the real background objects.

This goal is achieved by a method characterised by the steps recited in claims 1 and 8.

The main advantages of the disclosed method are that is does not require costly tracking equipment on the cameras pedestals; it can be used either for live events or recorded images; and it can replace dynamic or static content.

Further advantages of the invention will become apparent from the characteristics recited in the dependant claims and in the following detailed description.

The present invention will now be described in detail with reference to accompanying drawings in which:

FIG. 7 is a flow chart showing the creation of the stereoscopic view serving to identify foreground and background objects, position and depth information when two camera feeds are available.

FIG. 8 is a flow chart showing the creation of the stereoscopic view serving to identify foreground and background objects, position and depth information when only one camera feed is available.

Figure 1:
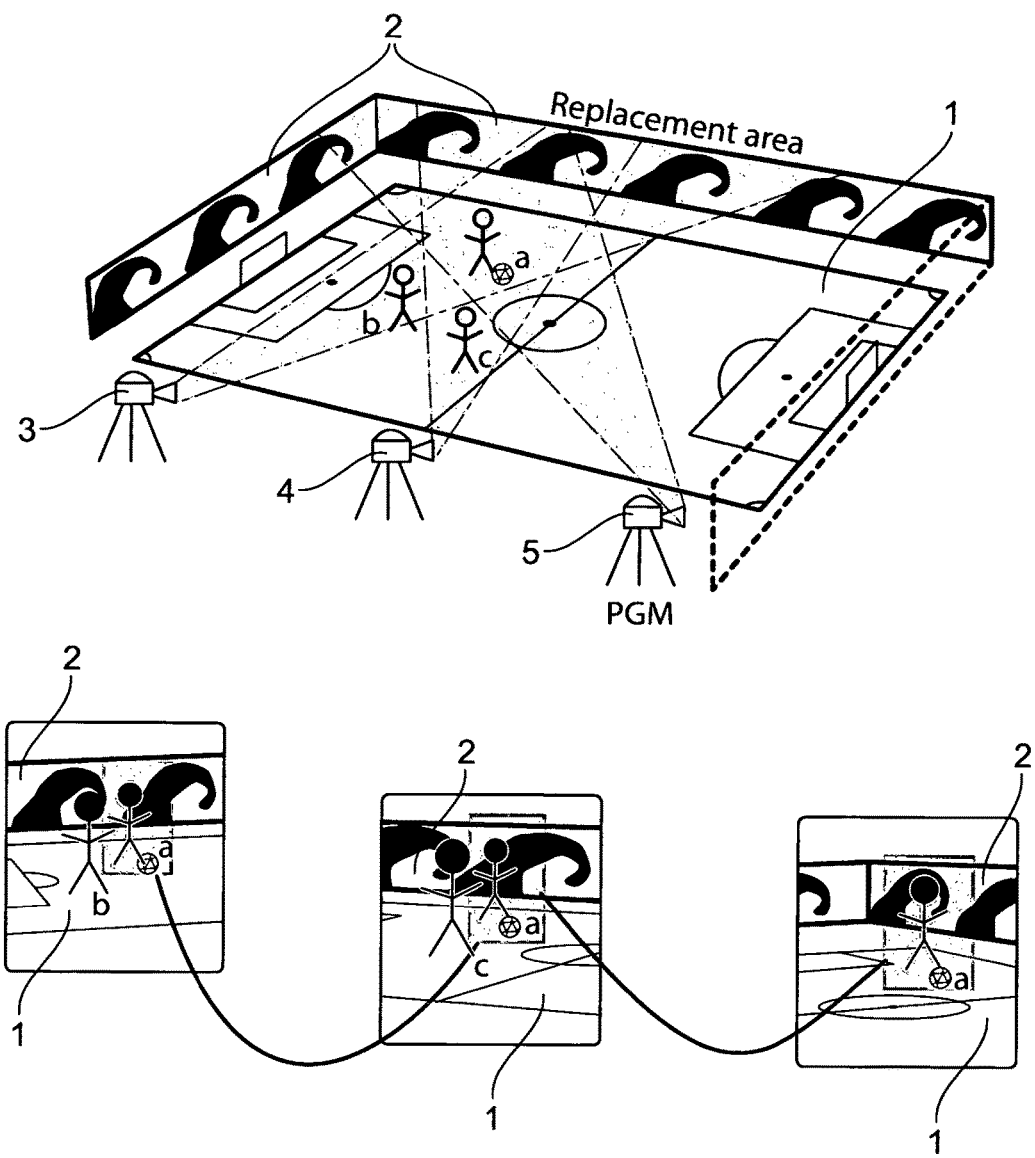
FIG. 1 is an illustration of a typical live sport production at the venue.

With reference to FIG. 1, there is shown a typical live sport production at the venue in a stadium or at a sport field. A typical soccer game playground 1 is schematically represented with players a, b, c moving on it. The playground is surrounded with perimeter boards or electronic billboards 2 on which static or dynamic advertisement images may be displayed. In the typical case of a live venue, there are at least two main cameras 3, 4 recording continuously the game while another camera 5 (hereafter referenced as the PGM camera) is taken on-air by the production's director. A portion of the target image, the perimeter boards 1, 2, is visible in each camera's field of view. The bottom left reduced image shows camera 3's point of view; the bottom centre reduced image shows the point of view of camera 4; while the bottom right image represents what is seen through the PGM camera. Some players a, b are partially occluding the target image while in the PGM's field of view only some portion of the occluding objects as seen by the two other cameras 3,4 is visible.

Briefly summarized the method of the present invention to replace an object in a video stream consists of the following steps:

creating a stereoscopic view of the scene,
identifying the camera parameters from a video image,
identifying the object to be replaced in the image
calculating the contour of the occluding objects
creating an image of the replacement object with a mask for it
superimposing the generated image to the original image.

The method based on stereoscopic computer vision creates a stereoscopic 3D representation of the camera image (s), in a similar way to the processing of human stereoscopic vision. It then identifies objects with a perspective representation and replaces objects within the desired content while respecting the view depth of new objects. Using this method, it is possible to overcome the prior art constraints that typically require costly camera tracking equipment. In addition, the method can be operated in a live or in a post-production environment, and it works with dynamic content inside the images.

The stereoscopic 3D representation is constructed in two different ways:

The stereoscopic 3D human representation of the current image is constructed from feeds from at least two cameras. This method uses camera triangulation algorithms.

In the case of post-production or when only one camera feed is available, the stereoscopic 3D representation is obtained by reconstructing a spatial environment using image analysis techniques.

Using the stereoscopic 3D interpretation of the image, the method determines the position in the image of the object to be replaced and the possible foreground objects occluding the background object.

Processing pixel differences between the predicted image and the real one determines the area where a mask is placed to compose the replacement image.

The following methods of object replacement in a video stream are proposed:

Having at least one dual TV feed, two or more cameras, at the venue to construct a stereoscopic 3D representation and a depth table serving to calculate an occlusion mask for other objects placed in the foreground of the object to replace. The method is described here with two cameras, the minimum required, but it applies as well when more cameras are available. This method will be further described in relation to FIG. 2.

Interpolating the stereoscopic view and creating the same object table and depth table for a single feed, or one camera image. This method is described in relation to FIG. 3.

An additional method uses a previously calculated image of the object to identify. This method is based on the differences between what is actually on the image and what should be on it without occluding objects. This method deals with the dynamic nature of objects to be replaced. It is in principle similar to static image replacement, but with the static image changing every field or frame.

A fourth method consists of matching the source dynamic image to be replaced with the camera recorded image to determine the pixels to be replaced. Finally, the process is also adapted to the case of high end cameras, either live or replay:

With 3D camera(s) content input the camera's stereoscopic information is turned directly into the stereoscopic representation.

The invention is applicable to any camera format. This includes consumer to formats as well as broadcast formats (SD, HD, 4K or other to come). More pixels in the format will result in an even sharper transformation.

The several processes described in the figures are embedded in an end to end workflow, analysing the video stream image by image (either frame by frame or field by field) and creating reference bases for the several cameras and objects.

We will now describe the different steps of the method, its different processes and calculations.

In relation with the different methods depicted above, some general concepts are applicable to the different variants of the invention and will be briefly described.

The concept of stereoscopic, as well as its equivalent binocular, is referring to two inputs or more, representing different perspectives of a scene or event, those inputs being from a camera or other image source. The embodiments of the present invention requiring two cameras are equally applicable with any larger number of cameras.

Different elements will be required to implement the method, depending on the method chosen. The first of these is camera identification, in order to build a table of cameras in which, every time a camera is identified, its parameters, mainly its coordinates (x, y, z) and at least some of the following parameters pan, tilt, zoom and focus, are stored. The camera's parameters are obtained from the images analyzed and not from external signals such as sensors associated with the camera pedestal. Existing computer vision detection techniques are used to determine the camera position (x, y, z) as well as its parameters. The detection technique is based on geometric elements identification, lines, circles, corners, angles, surfaces and invariant points. The perspective transformation matrix built to match the identified elements with its image representation determines the desired camera parameters.

Objects are detected and placed in the field representation using known methods of camera triangulation. Two different cameras recording the same object will provide different images revealing the object position.

In this sense, the camera triangulation process is similar to the human processing of stereoscopic vision, providing the mind with relief or depth information based on the difference of perspective between the two eyes. Comparing two images from two different cameras allows the extraction of objects from the two images and to determine each object's contours, inside pixels and distance to the camera.

When an image is received and processed, the background area is detected by calculating the difference between two successive images of the same sequence, using known background detection algorithms. Suitable methods adapted to background detection for the purpose of the present invention are disclosed in the following document: "Background subtraction techniques: a review" 2004 IEEE International Conference on Systems, Man and Cybernetics 0-7803-8566-7/04/© 2004 IEEE.

With regard to camera movement detection, the difference of representation between two consecutive images of a sequence is a widely researched area, providing many techniques and algorithms, as summarised in "Performance characterization of video-shot-change detection methods" IEEE TRANSACTIONS ON CIRCUITS AND SYSTEMS FOR VIDEO TECHNOLOGY, VOL. 10, NO. 1, FEBRUARY 2000.

Once the camera parameters have been updated between two images and the background detected, the remaining pixels of the image form the foreground objects. A differential analysis of the foreground objects between the two images is applied and serves to update the object's 3D model and the distances to the camera.

In the following description, the notion of depth table will also be used. As used in the present invention, the depth table is the collection of pixels with the same or equivalent z value for the current image and camera. The pixels with the same depth are grouped into objects creating the table of objects with the object's depth associated to it for a certain camera image.

Traditionally, depth value for a pixel is converted into a level of grey that can be coded into a 0-255 or even larger value. The depth table is actually an image composed of the associated grey values of the real image, the darker the further.

Depth table (or z-table) issued from a stereoscopic or 3D camera can be imported into the depth table. The same applies to the foreground objects identified in the foreground detection process.

The description of the invention sometimes refers to a stereoscopic representation, or a stereoscopic view of the scene. This is a representation of the scene as seen from the cameras, including all the objects visible from this point of view. The objects are represented as the distance from the camera, the set of pixels composing the object, the position in the field and its modelling and dynamic parameters.

The stereoscopic representation thus comprises the collection of the depth tables for all the foreground objects, the camera parameters and the background object.

For the object or zone to be replaced, extra parameters are kept, including the 3D accurate geometric model of the zone as seen from the camera(s).

For replacing part of the image at the end of the replacement process, the notion of replacement mask is introduced. An occlusion occurs when there is an object in the foreground partially masking the area to be replaced in the background.

Calculating the occlusion is based on the stereoscopic representation. The occlusion mask is limited to the camera visible part of the object to be replaced, calculated as the external contour of the 3D model of the object, as seen by the camera. This is what is called the replacement mask.

For each single object stored in the stereoscopic view, the part of the object included in the replacement mask is actually occluding the object subject to replacement. Therefore, the occlusion mask is the sum of the intersection of the occluding objects with the replacement mask.

This sum is calculated (sorted) by the descending distance to the camera. This is similar to the application of layers in imaging technology. Applying layered objects on top of the mask constructs at the same time the mask contour and the mask pixels.

Figure 2:
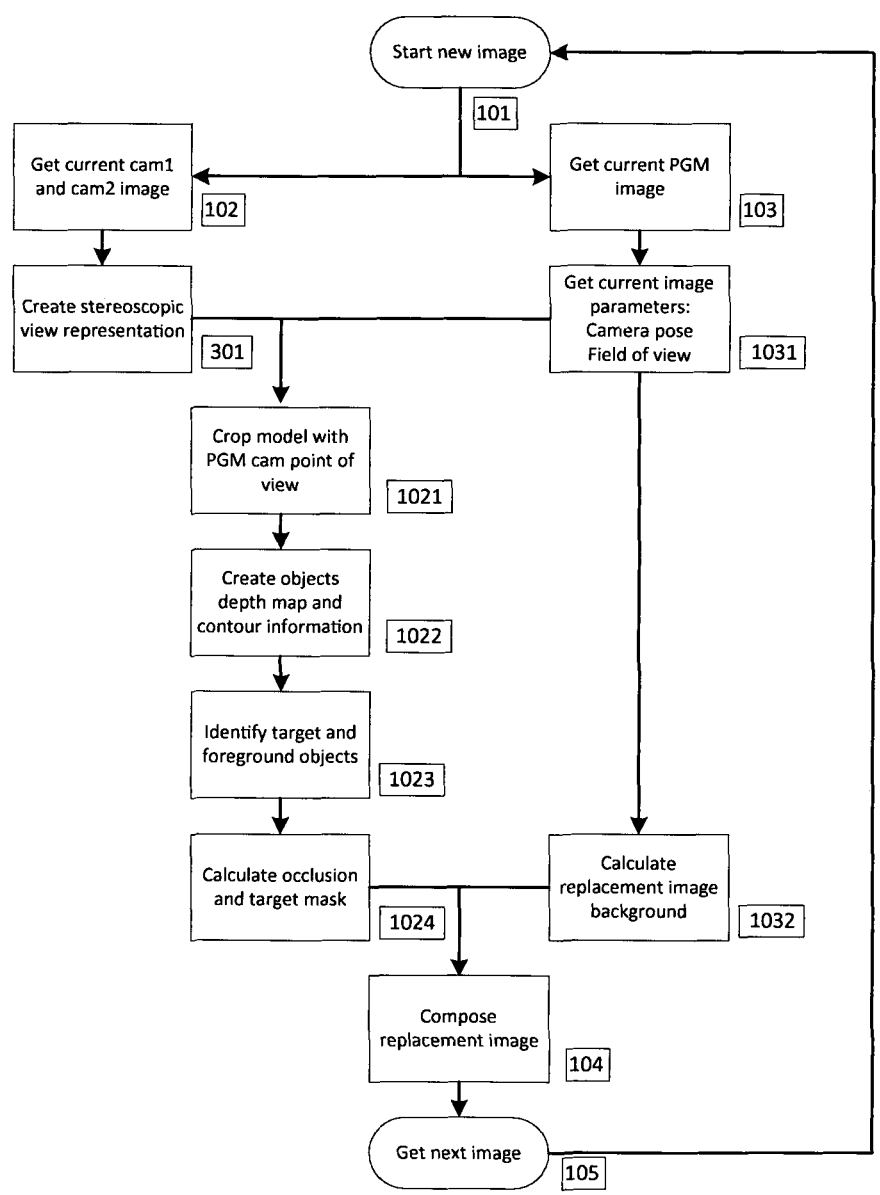
FIG. 2 is a flow chart depicting the image replacement process when two camera feeds are available.

FIG. 2 refers to the image replacement process when two camera feeds are available; this is the live case at the venue. Before the event, the camera map, including predefined camera position or camera axes in case of moving cameras such as a spider cam, is acquired and introduced in the initial setup of the system. During the whole event, the system receives the images produced by the two main cameras 3,4. Referring to FIG. 2, there is a loop (step 101 to 105) processed for each image.

The loop begins with receiving the images from each camera 3,4 at step 102 as well as receiving in parallel the images from the PGM camera 5 at step 103.

With camera 3 and camera 4 images, a perspective view of the scene is created at step 301 similar to the human representation of binocular vision. The process for creating the perspective view will be further described in reference to FIG. 6.

In parallel with step 301, the image of the PGM camera 5 is analysed to extract the camera parameters (or cam pose) at step 1031, allowing the determination of the position (x, y, z) of the PGM camera as well as its direction (pan, tilt, zoom, and focus).

Using the stereoscopic view and the PGM camera pose parameters, the point of view of the PGM camera is computed at step 1021.

From the camera position, the objects identified as possible occlusion in the perspective view created at step 301 are recalculated at step 1022 and a depth table for each object is created. The depth table contains contour information of the detected objects as well as, for each object in view of the camera, the distance to the camera (depth or z-table).

The target image and foreground objects are then identified at step 1023. Foreground object contour information is further used to compute an occlusion mask at step 1024. This mask is the representation (3D image) of the object to be replaced, minus the objects in the field of view having a lower z than the object.

Then the replacement image background is calculated using the position of the PGM camera at step 1032 and the occlusion mask is applied on it, so the image replacement object is applied as an additional layer to the PGM camera image at step 104. The process then continues with the next image at step 105.

Figure 3:
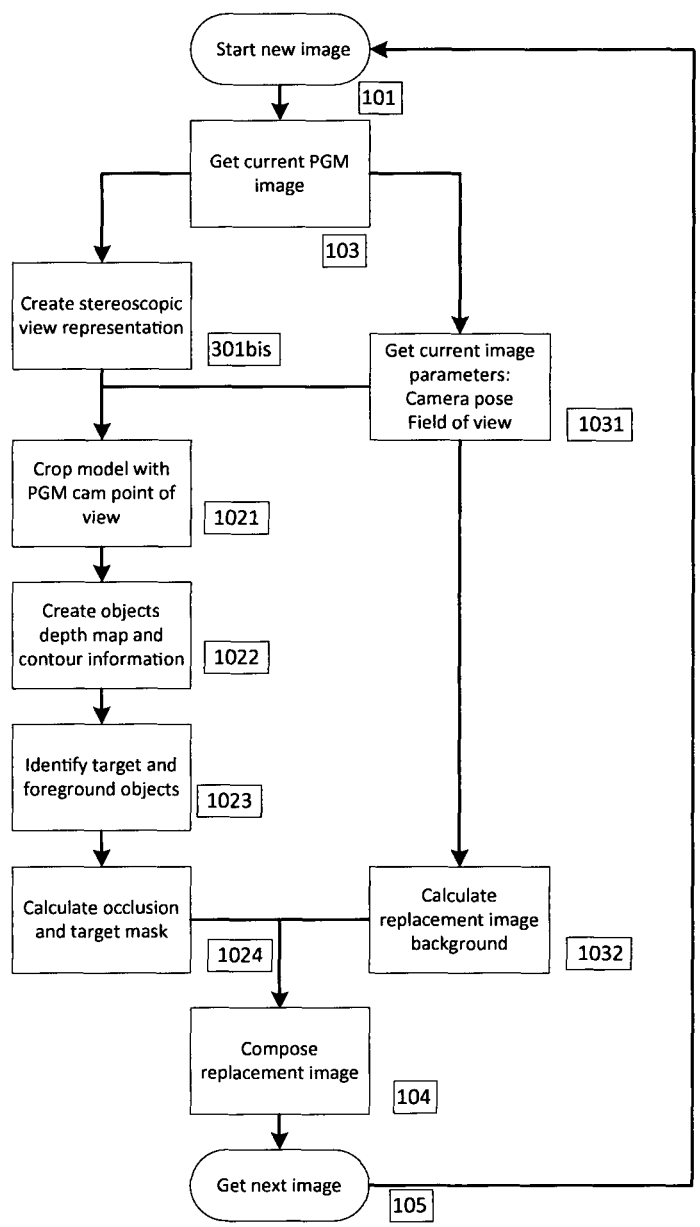
FIG. 3 is a flow chart depicting the image replacement process when only one camera feed is available.

FIG. 3 refers to the image replacement process when only a single camera feed is available. This may be for example a live video received at the broadcaster's studio or a recorded event. This process is similar to the previous case, described in relation with FIG. 2, but differing in two steps:

As there is only one camera feed available, step 102 of the previous dual feed process is removed. The creation of perspective view of step 301 in FIG. 2 is replaced with step 301bis that creates the perspective view with images received from a single feed. Process 301bis will be further described with reference to FIG. 8. The other steps are identical to those of FIG. 2.

Figure 4:
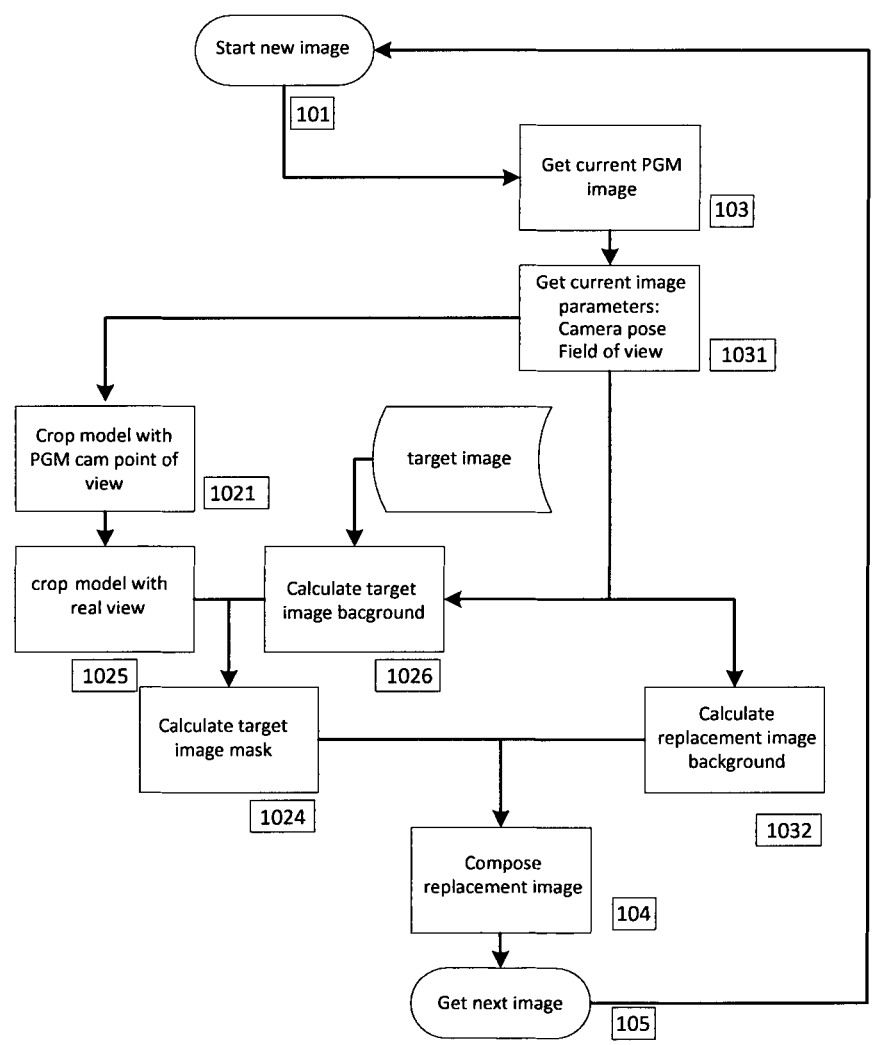
FIG. 4 is a flow chart depicting the image replacement process when an electronic representation of the target image to be replaced is available.

FIG. 4 depicts the flow chart of an alternate process of the basic image replacement process as described in reference to FIG. 2. FIG. 4 refers to the case in which an electronic representation of the image to be replaced is available. In that case, there is no need to create the object depth table, as well as calculating the contour information and identifying the target and foreground objects thus bypassing steps 102, 1021, 1022, 1023 and 301 of FIGS. 2 and 3. The target image real view is processed, as is the area within the image corresponding to the target at step 1025. Then the target image background is calculated as a combination of the source image and the PGM camera parameters, the cam pose (step 1026). The applicable mask calculated at step 1024 corresponds to the pixel difference between the camera recording of the target image, obtained from step 1025, and the target image background obtained at step 1026.

A simplification of the process depicted in FIG. 4 happens when the electronic representation of the image to be replaced can be identified in the camera image. Using computer vision pattern recognition, the source image can be identified and its placement and perspective in the picture determined. There is no need to calculate the camera parameters, since the perspective correction for the source and replacement images is the same as the one detected from the camera image. The result is the compositing of the replacement image in perspective together with the occlusion mask, calculated as the pixel difference between the identified image and its perspective corrected source.

Figure 5:
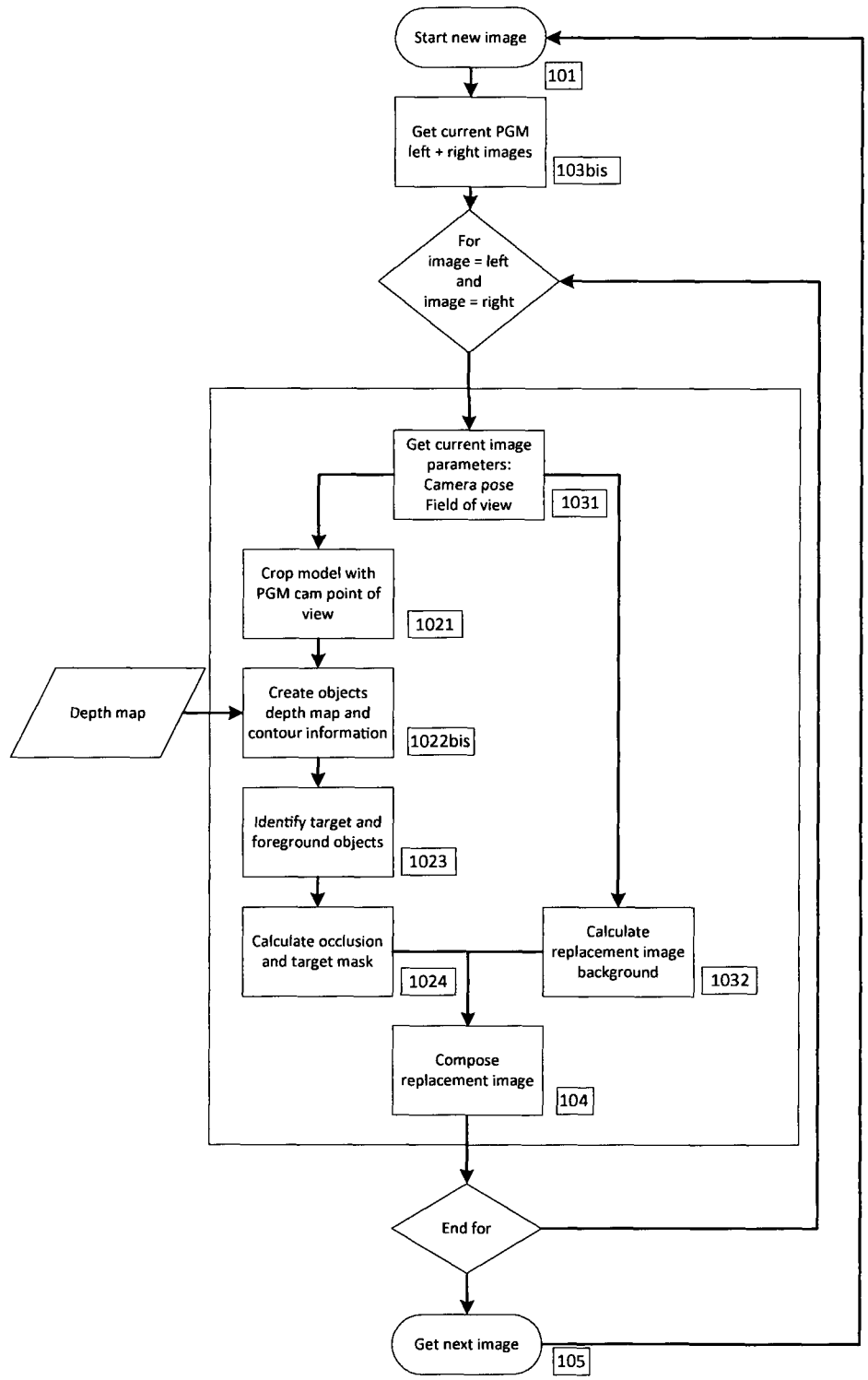
FIG. 5 is a flow chart depicting the image replacement process when the camera feed is in 3D.

With reference to FIG. 5, the camera feed is already in 3D. Each camera provides a left image, a right image and a depth table. The image replacement process is simplified with the use of this stereoscopic information received directly from the camera feeds. The process is very similar to that described in reference to FIG. 2 with a difference that it runs for both images, left and right, as shown at step 103bis replacing step 103 of FIG. 2. A second difference is that depth information about the occluding objects is received from the cameras and consequently there is no need to calculate them. All the other steps are identical to those described in reference to FIG. 2.

Figure 6:
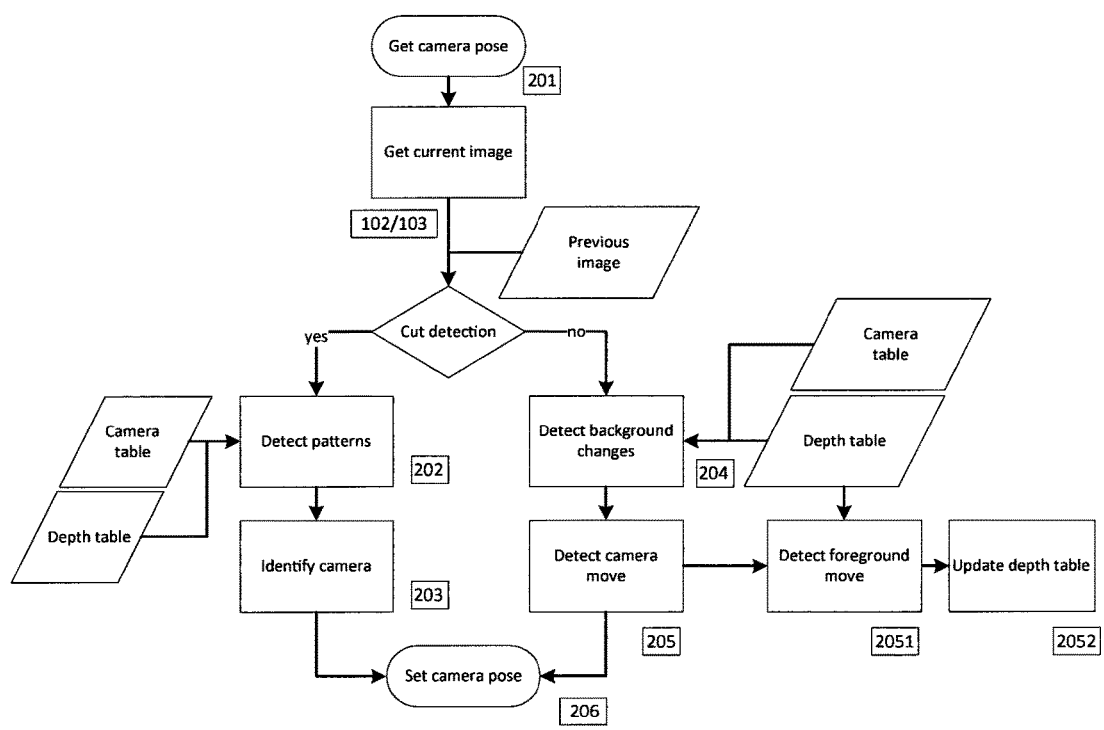
FIG. 6 is a flow chart showing the process of acquiring the camera information.

With reference to FIG. 6, the process of retrieving the camera information is detailed. For each image obtained at steps 102 or 103, it is determined if a cut with the previous image occurred. When there is no cut between the previous image and the current one, the process is purely differential, computing changes in relation to the previous image. If no cut occurred with the previous image, the background information and the PGM camera settings from the previous image are used to compute the background changes at step 204 as well as to determine the camera parameter modification (if any). Once the adapted camera parameters have been computed, the new camera parameters are stored at step 206. By using the new camera parameters and the background information, the displacement of the foreground objects is calculated at step 2051 and for each foreground object, the depth table is updated at step 2052.

If an image cut occurs, the camera table serves to identify possible matches between the current view and stored views corresponding to existing past camera positions. At step 202, pattern recognition techniques, especially for field lines or known elements, are used to find the correct match and identify the correct camera at step 203. Optionally, user input can be requested to provide a better and quicker match in the form of reference point(s) determination.

The output of step 203 is to set the new camera pose parameters. (step 206).

FIG. 7 deals with the creation (301) of the perspective 3D view serving to identify foreground and background objects, position and depth information, using the two available camera feeds.

The first step is setting camera pose for the first and second camera using process 201 in the no cut scenario, since both cameras are always available and produce a continuous feed.

When these camera poses are set, the PGM view is used to determine the background and foreground information (steps 204, 2051 and 2052) for the PGM cam, in the same manner as described for these processes in FIG. 6.

FIG. 8 describes the process 301bis of setting the perspective view as a variation of process 301 (described in FIG. 7) in the event that no dual feed is available.

The process begins with retrieving the camera pose (201). Cut detection will have been performed at this point as part of step 201.

When no cut is detected between the previous and current image, the background detection (204) and foreground analysis (2051) process steps serve to update the depth table (2052). These steps are identical to those described in FIG. 6.

When a cut is detected, the process gets the next image (step 103). With camera pose information and analysis of the differences between the current and next images the depth table is reconstructed (2052) using background (204) and foreground (2051) constructions.

The stereoscopic view is set (302) as the result of cam pose (201), background information (204), foreground information (2051) and depth table (2052).

The methods and processes depicted above are also applicable to high end cameras where a native 3D video feed is available. When the video signal is already in 3D, the left and right images are available together with a depth table or z-space. The image replacement method takes advantage of this additional information in several ways that ease the computing resources needed to achieve the image replacement. By analogy, the dual feed of two cameras is available, replaced by the left and right image and the depth information is embedded in the video signal, or if not, it can be extracted by difference analysis between the left image and the right image.

When the video recording is only in 2D, 3D conversion techniques exist for rendering a 3D video signal, taking the original feed as left eye and constructing the right eye video signal. This process adds a few seconds delay in the treatment of the signal but simplifies the image replacement and is therefore suitable for applying the method object of the present invention to recorded video.

The steps of the methods described above may be executed using hardware, software, or a combination of both. If the process steps are executed using software, a computer program with a sequence of the process steps may be installed in memory of a computer built in dedicated hardware, or installed on a general-purpose computer performing a variety of processes. The computer program may be pre-recorded on a recording medium. The computer program may then be installed onto the computer. The computer program may be received via a network such as a local area network (LAN) or the Internet and then installed onto an internal recording medium such as a hard disk.

In the foregoing manner, methods for object replacement within a live or recorded video stream have been disclosed. While the invention has been described with reference to specific embodiments, the description is illustrative of the invention and is not to be construed as limiting the invention. Various modifications may occur to those skilled in the art without departing from the scope of the invention as defined by the appended claims.

The invention claimed is:

1. A method for replacing objects in a video stream comprising:
   receiving one or more images from at least one camera;
   analyzing the one or more images to extract camera pose parameters, the camera pose parameters at least including x, y, and z axis coordinates and direction of the camera;
   creating a stereoscopic view using a depth table for objects viewed by the camera, wherein the depth table defines a distance along the z-axis from a camera lens to each object in a field of view of the camera, the depth table comprising a plurality of pixels having z values, wherein pixels are grouped into objects based on the z values and foreground object contours being the outerlines joining the pixels of a group;
   identifying a foreground object that occludes a background object using the stereoscopic view and the depth table;
   detecting the foreground object contours;
   creating an occlusion mask using the foreground object contours;
   calculating a replacement image using the camera pose parameters; and
   applying the occlusion mask to the replacement image.

2. The method according to claim 1, wherein the stereoscopic view is created based on images received from at least two cameras.

3. The method according to claim 1, wherein extracting the camera pose parameters includes:
   detecting if a cut between a current image and a previous image occurred;
   wherein if no cut occurred,
      using background information and camera pose parameters of the previous image in a comparison between the current image and the previous image to compute background changes and determine a camera pose parameter modification,
      computing background information from the background changes and new camera pose parameters from the camera pose parameter modification, and
      computing displacement of a foreground object using the background information and new camera pose parameters and updating the depth table for the foreground object; and
   wherein if a cut occurred,
      identifying a correct camera from possible matches between the current image and stored image views, and
      setting new camera pose parameters.

4. The method according to claim 1, wherein creating the stereoscopic view comprises:
   setting the camera pose parameters using background information and camera pose parameters of a previous image in a comparison between the current image and the previous image to compute background changes and determine a camera pose parameter modification;
   computing the displacement of a foreground object using the background information and new camera pose parameters; and
   updating the depth table for each foreground object.

5. The method according to claim 1, wherein creating the stereoscopic view when only a single camera is available comprises:
   receiving the camera pose parameters; and
   detecting a cut between a current and a previous image;
   wherein
   if no cut is detected,
      detecting background and foreground information, and updating depth tables; and
   if a cut is detected,
      receiving a next image, and using the camera pose parameters to analyze differences between the current and the next image and using background and foreground information to update depth tables.

6. The method according to claim 1, wherein the one or more images from the at least one camera form a feed that is received in 3D, and wherein depth information related to the object is obtained directly from the feed.

7. The method according to claim 1, further comprising a replacement process, wherein the replacement process comprises:
- matching a source image to be replaced in an image of the one or more images with an available representation of the source image,
- calculating a difference between the available representation of the source image and the source image to be replaced, and
- extracting camera pose parameters.

8. The method according to claim 1, further comprising:
- identifying a source image to be replaced from an image of the one or more images using pattern recognition.

9. A system for replacing objects in a video stream comprising a computer configured to:
- receive one or more images from at least one camera;
- analyze the one or more images to extract camera pose parameters, the camera pose parameters at least including x, y, and z axis coordinates, and direction of the camera;
- create a stereoscopic view using a depth table for objects viewed by the camera, wherein the depth table defines a distance along the z-axis from a camera lens to each object in a field of view of the camera, and wherein the depth table comprises a plurality of pixels having z values, where pixels are grouped into objects based on the z values and foreground object contours being the outer-lines joining the pixels of a group;
- identify a foreground object that occludes a background object using the stereoscopic view and the depth table;
- detect the foreground object contours from the identified foreground object;
- create an occlusion mask using the foreground object contours;
- calculate a replacement image using the camera pose parameters; and
- apply the occlusion mask to the replacement image.

10. The system according to claim 9, wherein the stereoscopic view is created based on images received from at least two cameras.

11. The system according to claim 9, wherein extracting the camera pose parameters includes:
- detecting if a cut between a current image and a previous image occurred;
- wherein if no cut occurred,
  - using background information and camera pose parameters of the previous image in a comparison between the current image and the previous image to compute background changes and determine a camera pose parameter modification,
  - computing background information from the background changes and new camera pose parameters from the camera pose parameter modification, and
  - computing displacement of a foreground object using the background information and new camera pose parameters, and updating the depth table for each object; and
- wherein if a cut occurred,
  - identifying a correct camera from possible matches between the current image and stored image views, and
  - setting the new camera pose parameters.

12. The system according to claim 9, wherein creating the stereoscopic view comprises:
- setting the camera pose parameters using background information and camera pose parameters of a previous image in a comparison between the current image and the previous image to compute background changes and determine a camera pose parameter modification;
- computing background information from the background changes and new camera pose parameters from the camera pose parameter modification, and
- computing the displacement of a foreground object using the background information and new camera pose parameters, and updating the depth table for each object.

13. The system according to claim 9, wherein creating the stereoscopic view when a single camera is available comprises:
- receiving the camera pose parameters; and
- detecting a cut between a current and previous image,
- wherein if no cut is detected,
  - detecting background and foreground information, and updating depth tables; and
- wherein if a cut is detected,
  - receiving a next image, and
  - using the camera pose parameters to analyze differences between the current and the next image and using background and foreground information to update depth tables.

14. The system according to claim 9, wherein the one or more images from the at least one camera form a feed that is received in 3D, and wherein depth information for an object is obtained directly from the camera feed.

15. The system according to claim 9, wherein the computer is further configured for a replacement process, wherein the replacement process comprises:
- matching a source image to be replaced in an image of the one or more images with an available representation of the source image,
- calculating a difference between the available representation of the source image and the source image to be replaced, and
- extracting camera pose parameters.

16. The system according to claim 9, wherein the computer is further configured to:
- identify a source image to be replaced from an image of the one or more images using pattern recognition.

17. A tangible non-transitory computer readable medium storing instructions for replacing objects in a video stream that, when executed by at least one processor, cause the at least one processor to perform a method, comprising:
- receiving one or more images from at least one camera;
- analyzing the one or more images to extract camera pose parameters, the camera pose parameters at least including x, y, and z coordinates, and direction of the camera;
- creating a stereoscopic view using a depth table for objects viewed by the camera, wherein the depth table defines the distance along the z-axis from the camera lens to each object in a field of view of the camera, and wherein the depth table comprises a plurality of pixels having z values, where pixels are grouped into objects based on the z values and foreground object contours being the outer-lines joining the pixels of a group;
- identifying a foreground object that occludes a background object using the stereoscopic view and the depth table;
- detecting the foreground object contours from the identified foreground object;
- creating an occlusion mask using the foreground object contours;
- calculating a replacement image using the camera pose parameters; and
- applying the occlusion mask to the replacement image.

18. The non-transitory computer readable medium according to claim 17, wherein establishing the camera pose parameters comprises:
- detecting if a cut between a current image and a previous image occurred;
- wherein if no cut occurred,
  - using background information and camera pose parameters of the previous image in a comparison between the current image and the previous image to compute background changes and determine a camera pose parameter modification,
  - computing background information from the background changes and new camera pose parameters from the camera pose parameter modification, and
  - computing the displacement of a foreground object using the background information and new camera pose parameters, and updating the depth table for each object; and
- wherein if a cut occurred,
  - identifying a correct camera from possible matches between the current image and stored image views, and
  - setting the new camera pose parameters.

19. The non-transitory computer readable medium according to claim 17, wherein creating the stereoscopic view comprises:
- setting the camera pose parameters for two cameras using background information and camera pose parameters of a previous image in a comparison between the current image and the previous image to compute background changes and determine camera pose parameter modification;
- setting the camera pose parameters for a portable gray map camera;
- computing background information from the background changes and new camera pose parameters from the camera pose parameter modification, and
- computing the displacement of a foreground object using the background information and new camera pose parameters, and updating the depth table for each object.

20. The non-transitory computer readable medium according to claim 17, wherein creating the stereoscopic view when a single camera is available comprises:
- receiving the camera pose parameters; and
- detecting a cut between a current and previous image,
- wherein if no cut is detected,
  - detecting background and foreground information, and updating depth tables; and
- wherein if a cut is detected,
  - receiving a next image, and
  - using the camera pose parameters to analyze differences between the current and the next image and using background and foreground information to update depth tables.

* * * * *